United States Patent Office 3,101,592
Patented Aug. 27, 1963

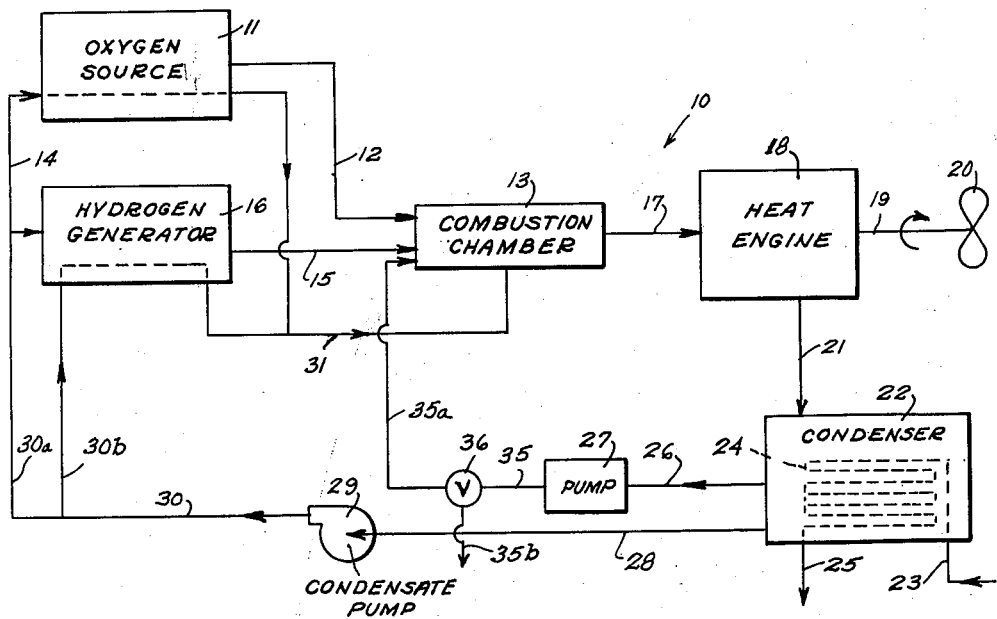

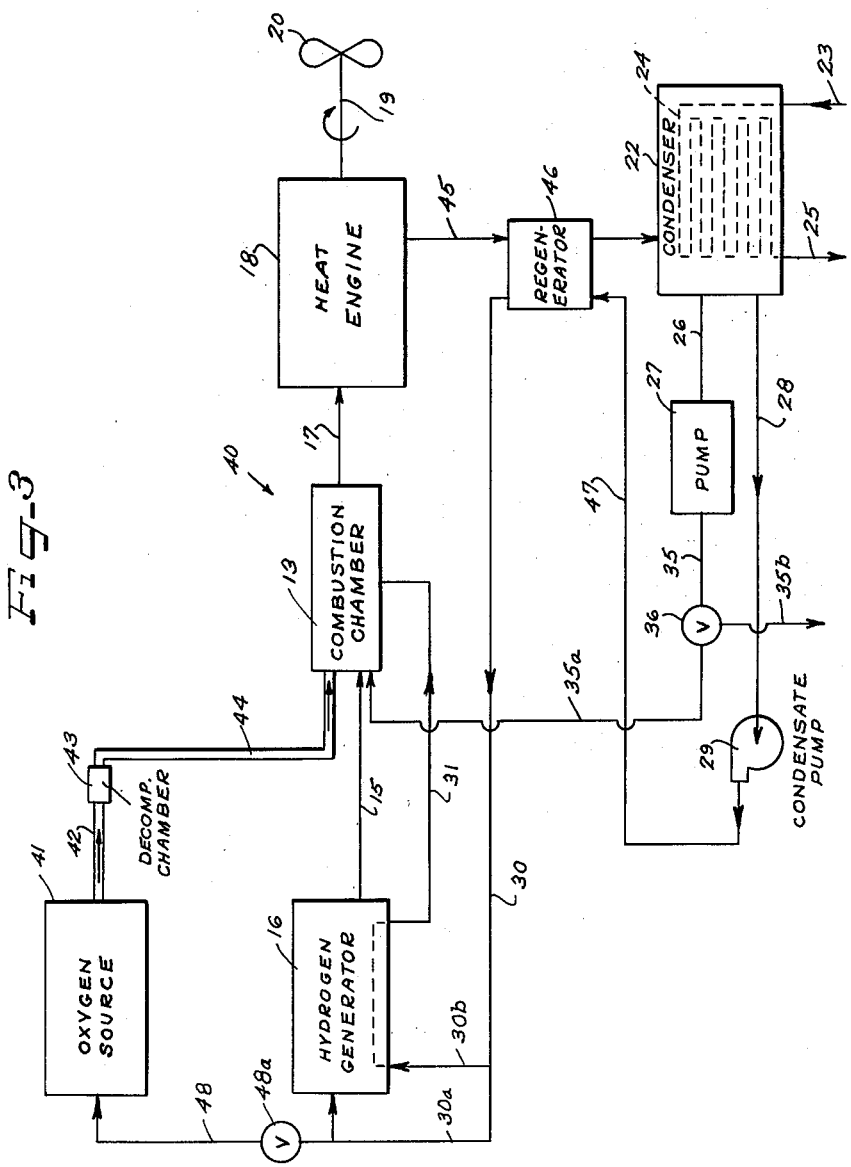

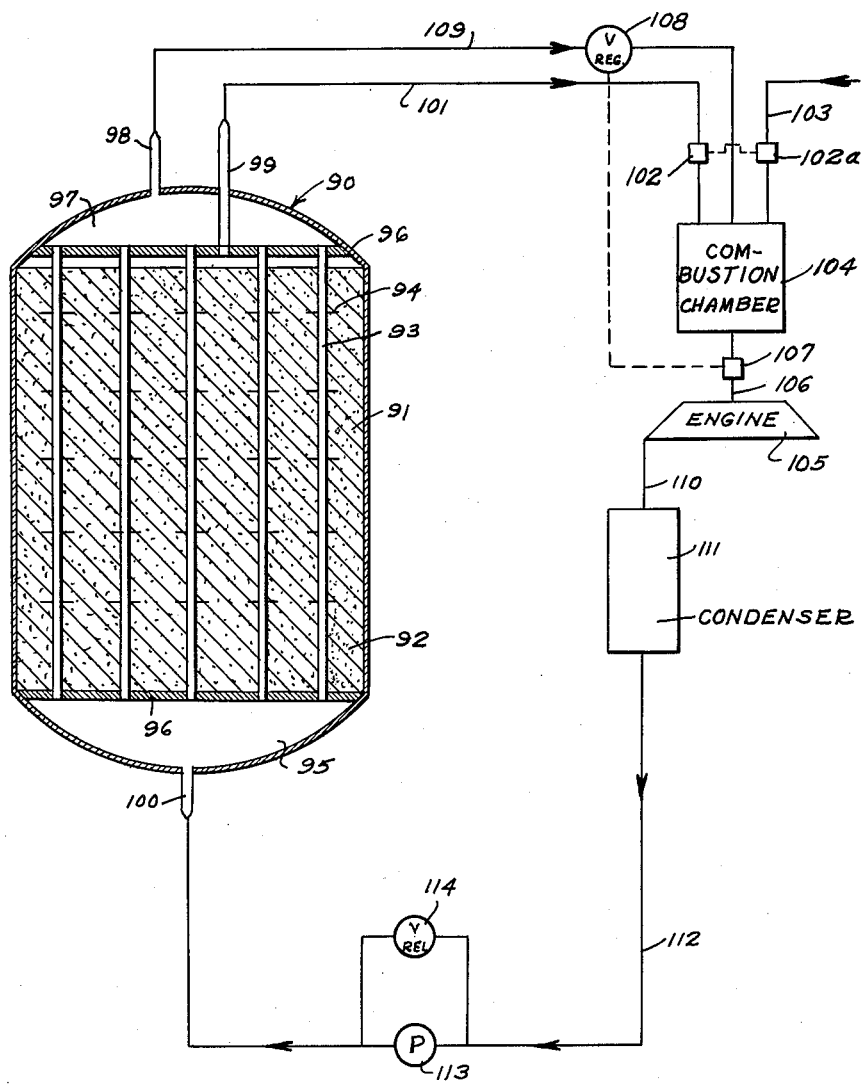

3,101,592
CLOSED POWER GENERATING SYSTEM
Anthony E. Robertson, Willoughby, Ohio, and Joseph T. Hamrick, Roanoke, Va., assignors to Thompson Ramo Wooldridge Inc., Cleveland, Ohio, a corporation of Ohio
Filed Jan. 16, 1961, Ser. No. 83,000
3 Claims. (Cl. 60—39.46)

The present invention relates broadly to power plants and is more particularly concerned with a new and improved power plant for under water use featuring as the energy source a chemical system productive of the important advantages of essential absence of exhaust noises and a power output independent of operating depth.

While other applications may exist, the power plant of this invention is productive of especially advantageous results when employed for submarine and torpedo propulsion, and the description will be directed particularly to a power plant for deep running torpedoes. As is known, the basic problem in torpedo power plants is to obtain maximum power for a minimum in weight and space. Since torpedoes are relatively short range devices, it is required that the power plant have a high power output for a relatively short time. Battery driven electric motors and heat engines, both of the turbine and piston type, have been widely used for torpedo propulsion. In addition, fuel cells and atomic reactors have been considered for this purpose.

However, within the present state of the art, electric systems cannot meet the speed and range requirements of advanced design torpedoes due to the relatively high weight of batteries and electric motors. The same situation appears to prevail with respect to fuel cells, in spite of their relatively high efficiency of conversion of chemical to electrical energy. Atomic powered torpedoes, on the other hand, could be built to have the required performance, at least in the larger sizes, but the resulting structure can be anticipated to be relatively cumbersome and costly.

It is for these reasons that heat engines appear to hold the greatest promise as the foremost contenders for fulfilling the power plant requirements of torpedoes and submarines for the foreseeable future. However, present heat engines for torpedoes have the basic problem of a drastic reduction in power as the depth increases, due largely to the increase in exhaust pressure and the resulting loss in cyclic efficiency. In addition, for acoustic homing torpedoes the noise generated by the exhaust constitutes an undesirable contribution to the torpedo self-noise.

It is accordingly an important aim of the present invention to provide a power plant for under water use employing either a semi-closed or fully closed cycle in which preferably all of the working fluids are condensed and nothing is exhausted, thereby producing a power output independent of operating depth and further featuring an essential absence of exhaust noises.

Another object of this invention lies in the provision of a deep operating power plant having as one feature thereof burning hydrogen and oxygen to produce super-heated steam which is expanded in a heat engine and then condensed to water, producing a cycle independent of ambient pressure.

Another object of the instant invention is to produce a power plant of the foregoing character, additionally featuring use of the condensed water to cool the combustion chamber by spraying water therein to produce additional superheated steam for use in the heat engine.

Still another object of this invention lies in the provision of a power plant wherein the non-condensible gases are directed to the combustion chamber, rather than ported overboard, thereby eliminating any wake and effecting substantial fuel savings.

A further object of the present invention is to provide a power plant for torpedo and submarine propulsion wherein hydrogen and oxygen are burned to produce superheated steam, the hydrogen and/or oxygen being provided by adding condensate water to water reactive chemicals.

Other objects and advantages of the invention will become more apparent during the course of the following description, particularly when taken in connection with the accompanying drawings.

In the drawings, wherein like numerals designate like parts throughout the same:

FIGURE 1 is a schematic diagram of a power plant system embodying the novel concepts of this invention;

FIGURE 2 is a sectional view of one form of combustion chamber which can be utilized in practice of this invention;

FIGURE 3 is a schematic diagram of another power plant system incorporating the instant teachings; and FIGURE 4 is a more or less diagrammatic view of an exemplary form of hydrogen generator which may be used in the systems of FIGURES 1 and 3, and further showing the connections therefrom to certain other elements of the power plant system.

Briefly stated, the present invention is directed toward a power plant system for under water applications featuring supplying gaseous hydrogen and oxygen to a combustion chamber from suitable sources, which in the case of oxygen may be hydrogen peroxide to be catalytically decomposed or a metallic peroxide or a superoxide that is reactive with water. The hydrogen source, on the other hand, may be a water reactive compound and exemplary thereof are diborane and certain metal hydrides and borohydrides. Within the combustion chamber combustion is initiated, the hydrogen essentially completely oxidized and the combustion products cooled to approximately 1200° F. by the injection of liquid water or steam.

The superheated steam from the combustion chamber is expanded in a heat engine and ported to a condenser preferably cooled by sea water. The condensate water is then directed to the combustion chamber for cooling purposes, producing additional superheated steam, and if desired, a portion of the condensate water can be added to water reactive chemicals for producing hydrogen and/or oxygen. Most preferably, any non-condensable gases are directed to the combustion chamber. It may now be noted that there is herein provided a closed cycle in which essentially all of the working fluids are condensed and any non-condensibles are burned, so that no gases are discharged overboard. The power output of the disclosed system is not dependent upon the operating depth, exhaust noises and wake are essentially entirely eliminated, and substantial fuel savings are effected.

In the past various types of turbines and piston engines have been used to drive torpedoes, and generally speaking, all of these systems have exhausted to ambient pressures. While this is satisfactory as long as the ambient pressure is relatively small, with increasing ambient pressure a typical system wherein the heat engine uses the gas produced by the burning of a solid grain propellant shows, for a given propellant consumption rate, a rapid decrease in power and a corresponding increase in specific fuel consumption. However, with the instant chemical propulsion system in which essentially all of the combustion products are condensible, performance can be made completely independent of the operating depth.

The hydrogen and the oxygen may be stored as compressed gases, or in the form of chemical compounds. By the proper choice of chemicals, there is produced large amounts of the desired gases per unit of weight and volume. Further, the desired gases are produced in a controlled manner by a readily available mechanism, and in addition, there results no reaction products, in addition to the desired gas, other than steam and non-volatile solids or liquids.

A number of inorganic compounds that could be used as a source of oxygen and which possess one or more of the named characteristics are listed in Table I, accompanied by notation of certain of the physical and thermodynamic properties of these compounds. The reactions which the listed compounds undergo to produce oxygen are set forth in Table II, and appearing therein is specific information as to the amounts of oxygen and heat produced. Table III set forth hereinafter, on the other hand, lists physical and thermodynamic data on the products of the reaction of both oxygen and hydrogen producing compounds other than oxygen and hydrogen.

Next in order of yield is hydrogen peroxide, and this compound also has the advantage of producing relatively large amounts of heat and water on decomposition. Sodium superoxide, on the other hand while being almost as good as hydrogen peroxide from the standpoint of weight, is less desirable insofar as water and heat balances are concerned, and further, at present this compound is not commercially available. As to potassium superoxide and lithium peroxide, each is a relatively poor source of oxygen from the standpoint of weight. Accordingly, considering commercial availability and oxygen yields on a weight basis, it may be seen that at present only hydrogen peroxide is suitable as a chemical source of oxygen.

Regarding now water reactive chemicals which may be used as sources of hydrogen in the power plant sys-

TABLE I

*Characteristics of Oxygen Producting Water Reactive Chemicals*

| Compound | Formula | M.W. | Sp. G. | M.P., °C. | B.P., °C. | $\Delta H_f$ Kcal./g. mole | $\Delta F_f$ Kcal./g. mole | Molar C: cal./degree mole |
|---|---|---|---|---|---|---|---|---|
| Hydrogen peroxide | $H_2O_2$ | 34 | 1.465 | −89 | 152.1 | −44.84 | −28.2 | |
| Lithium peroxide | $Li_2O_2$ | 45.88 | | | | −151.7 | | |
| Lithium superoxide | $LiO_2$ | 38.94 | | | | | | |
| Sodium superoxide | $NaO_2$ | 54.99 | | | | −61.9 | | 17.13/50° C. |
| Potassium superoxide | $KO_2$ | 71.10 | 2.14 | 380 | Dissociates at 660° C. | −66.8 | | 19.38/50° C. |
| Magnesium superoxide | $MgO_4$ | 88.32 | | | | | | |

TABLE II

*Production of Oxygen by Chemical Reactions*

| Chemical | Reaction | H (Kcal.) | Wt. of reactants (g.)[1] | KgCal.,g. reactants | Wt. ratio reactants Oxygen | Kcal., Mole $O_2$ | B.t.u., lb. reactants |
|---|---|---|---|---|---|---|---|
| Hydrogen peroxide | $2H_2O_2 \rightarrow 2H_2O + O_2$ | 25.92 | 68 | 0.38 | 2.1 | 25.92 | 684 |
| Lithium peroxide | $2Li_2O_2 + 2H_2O \rightarrow 4LiOH + O_2$ | 25.46 | 91.76 | 0.28 | 2.9 | 25.46 | 504 |
| Lithium superoxide | $2LiO_2 + H_2O \rightarrow 2LiOH + 1.5O_2$ | | 38.94 | | 1.6 | | |
| Sodium superoxide | $2NaO_2 + H_2O \rightarrow 2NaOH + 1.5O_2$ | 11.86 | 109.98 | 0.11 | 2.3 | 7.90 | 198 |
| Potassium superoxide | $2KO_2 + H_2O \rightarrow 2KOH + 1.5O_2$ | 1.64 | 142.20 | 0.01 | 3.0 | 1.09 | 180 |
| Magnesium superoxide | $MgO_4 + H_2O \rightarrow Mg(OH)_2 + 1.5O_2$ | | 88.32 | | 1.8 | | |

[1] The weight of water is not included in the weight of reactants.

TABLE III

*Characteristics of By Products of Hydrolysis Reactions of Water Reactive Chemicals*

| Compound | Formula | M.W. | Sp.G. | M.P.,° C. | B.P.,° C. | $\Delta H_f$ KgCal/mole [1] | $\Delta F_f$ KgCal/mole [2] | $C_p$ Cal/g.° C.[3] | Solubility, g./100 g. water |
|---|---|---|---|---|---|---|---|---|---|
| Aluminum hydroxide (ortho) | $Al(OH)_3$ | 77.97 | 2.42 | 300 / −2H₂O | | −304.2 | | .202 at 50° C | insol. |
| Aluminum hydroxide (pyro) | $AlO(OH)$ | 59.98 | 3.01 | −H₂O tr to Al₂O₃ | | | | | insol. |
| Aluminum oxide | $Al_2O_3$ | 101.94 | 3.97 | 2,015 | 3,500 | −399.09 | −376.77 | .198 at 50° C | insol. |
| Boric acid (ortho) | $B(OH)_3$ | 61.84 | 1.435 | 185 d | −1.5H₂ / 300° C | −260.2 | −230.2 | .315 | 5.15. |
| Boric acid (pyro) | $H_2B_4O_7$ | 157.3 | | | | | | | s. |
| Beryllium oxide | $BeO$ | 25.01 | 3.01 | 2,530 | 3,900 | −146.0 | −139.0 | .260 at 50° C | |
| Boron oxide | $B_2O_3$ | 69.64 | 1.844 | 450 | | −297.6 | −280.4 | .216 | s.s. |
| Calcium hydroxide | $Ca(OH)_2$ | 74.1 | 2.343 | −H₂O / 580° C | | −235.8 | −214.33 | .288 at 50° C | .185 (0° C.). |
| Lithium hydroxide | $LiOH$ | 23.95 | 1.46 | 450 | d 760mm. at 924° C. | −116.45 | −106.1 | .356 at 50° C | 12.8 at 20° C 17.5 at 100° C. |
| Lithium metaborate | $LiBO_2$ | 49.76 | | 845 | | | | | |
| Magnesium hydroxide | $Mg(OH)_2$ | 58.34 | 2.38 | −H₂O / 350° C | | −221.0 | −199.27 | | .001. |
| Magnesium oxide | $MgO$ | 40.32 | 3.58 | 2,800 | | −143.84 | −136.13 | .232 at 50° C | .0006. |
| Potassium hydroxide | $KOH$ | 56.10 | 2.044 | 360.4 | 1,320 | −101.78 | | | 107 (15° C.). |
| Sodium hydroxide | $NaOH$ | 40.01 | 2.13 | 318.4 | 1,390 | −101.99 | | .48 | 42 (0° C.). |
| Water | $H_2O$ | 18.0 | 1.00 | 0 | 100 | −68.32(l.) / −57.80(g.) | −56.69(l.) / −56.07(g.) | 1.00 | |

[1] Heat of formation at 298° K. [2] Free energy of formation at 298° K. [3] Specific heat at constant pressure.

In connection with Table II, it is to be noted that lithium and magnesium superoxides produce the highest yield of oxygen on a weight basis (assuming that the water is free), although at present there is relatively little data available on the properties of these two compounds.

tem of this invention, there is listed in the accompanying Table IV exemplary compounds, together with physical and thermodynamic data, where available. The reactions of these compounds with water are presented in Table V, and in Table III to which earlier reference was made there is set forth physical and thermodynamic data on the products of reaction.

a torpedo power plant there are a number of important considerations in addition to those discussed above. If

TABLE IV
*Characteristics of Hydrogen Producing Water Reactive Chemicals*

| Compound | Formula | M.W. | Sp.G./20° C. | M.P., ° C. | B.P., ° C. | $\Delta M_f$ | $\Delta F_q$ | Molar $C_p$ (293° K.) |
|---|---|---|---|---|---|---|---|---|
| Aluminum borohydride | $Al(BH_4)_3$ | 71.43 | .544 | −65 | 44.5 | −72.1 | −33.58 | |
| Beryllium borohydride | $Be(BH_4)_2$ | 38.65 | | 91.3 | 41.8 | | | |
| Calcium hydride | $CaH_2$ | 42.1 | 1.7 | 816 d | | −45.1 | −35.8 | |
| Decaborane | $B_{10}H_{14}$ | 122.31 | .78/100° C | 99.7 | 213 | +8 | | |
| Diborane | $B_2H_6$ | 27.69 | {.447 / (−112° C.)} | −165 | −92.4 | +7.53 | +19.8 | 13.48 |
| Lithium aluminum hydride | $LiAlH_4$ | 37.91 | | | | −165.87 | | |
| Lithium borohydride | $LiBH_4$ | 21.76 | 0.66 | 275 | | −44.6 | | 16.8 |
| Lithium hydride | $LiH$ | 7.948 | 0.780 | 680 | d | −21.34 | −16.45 | 8.177 |
| Magnesium borohydride | $Mg(BH_4)_2$ | 53.96 | | 180 | | | | |
| Pentaborane | $B_5H_9$ | 63.10 | 0.61/0° C | −46.6 | 58 | +7.72 | +38.52 | 35.8 |
| Sodium borohydride | $NaBH_4$ | 37.85 | 1.04 | 500 d | | −43.8 | −28.57 | 20.7 |

TABLE V
*Reactions of Hydrogen Producing Chemicals*

| Compound | Equation | $H_f$ (KgCal.) | Weight of reactants (g.) | KgCal., g. reactants | Wt. ratio reactants/Hydrogen | B.t.u., lb. reactants | KgCal., mole $H_2$ | B.t.u., lb. $H_2$ |
|---|---|---|---|---|---|---|---|---|
| Aluminum borohydride | $2Al(BH_4)_3 + 12H_2O \rightarrow Al_2O_3 + 3B_2O_3 + 24H_2$ | 327.86 | 142.86 | 2.293 | 2.98 | 4,125 | 13.65 | 12,790 |
| Beryllium borohydride | $Be(BH_4)_2 + 4H_2O \rightarrow BeO + B_2O_3 + 8H_2$ | | 38.65 | | 2.39 | | | |
| Calcium hydride | $CaH_2 + 2H_2O \rightarrow Ca(OH)_2 + 2H_2$ | 54.06 | 42.01 | 1.284 | 10.52 | 2,312 | 27.03 | 24,320 |
| Decaborane | $B_{10}H_{14} + 15H_2O \rightarrow 5B_2O_3 + 22H_2$ | 471.2 | 122.31 | 3.85 | 2.78 | 6,930 | 21.45 | 19,270 |
| Diborane | $B_2H_6 + 3H_2O \rightarrow B_2O_3 + 6H_2$ | 100.17 | 27.69 | 3.618 | 2.308 | 6,510 | 16.70 | 15,030 |
| Lithium aluminum Hydride | $2LiAlH_4 + 5H_2O \rightarrow 2LiOH + Al_2O_3 + 8H_2$ | 124.52 | 75.82 | 1.645 | 4.73 | 2,960 | 15.56 | 14,000 |
| Lithium borohydride | $2LiBH_4 + 5H_2O \rightarrow 2LiOH + B_2O_3 + 8H_2$ | 99.70 | 43.52 | 2.29 | 2.72 | 4,120 | 12.47 | 11,220 |
| Lithium hydride | $LiH + H_2O \rightarrow LiOH + H_2$ | 26.79 | 7.95 | 3.37 | 3.98 | 6,060 | 26.79 | 24,100 |
| Magnesium borohydride | $Mg(BH_4)_2 + 4H_2O \rightarrow MgO + B_2O_3 + 8H_2$ | | 53.96 | | 3.59 | | | |
| Pentaborane | $2B_5H_9 + 15H_2O \rightarrow 5B_2O_3 + 24H_2$ | 488.64 | 126.2 | 3.87 | 2.63 | 6,960 | 20.35 | 18,300 |
| Sodium borohydride | $2NaBH_4 + 5H_2O \rightarrow B_2O_3 + 2NaOH + 8H_2$ | 72.38 | 75.70 | 0.957 | 4.73 | 1,755 | 9.05 | 8,150 |

In a number of cases several different reaction products are possible. In the case of aluminum borohydride for instance, the aluminum could occur as $Al_2O_3$, $Al(OH)_3$ or $AlO(OH)$, while the boron could occur as $B_2O_3$, $B(OH)_3$ or $H_2B_4O_7$. In general the hydroxide forms were assumed, if they were stable in the expected operating temperature range of the hydrogen generator, i.e. 500–800° F. Data in the literature indicate that in the case of boron, the hydroxide (boric acid) is transformed to the oxide at 300° C. (572° F.), hence it is assumed that the oxide would be formed. The ortho aluminum hydroxide $Al(OH)_3$ is transformed to the pyro form ($AlO(OH)$) at 300° C. (572° F.) and to the oxide at some higher temperature. However, since thermodynamic data on the pyro form are not available, it was assumed that aluminum also would go to the oxide form. In cases where lithium occurs in the reaction products, it could be in the form of $LiOH \cdot H_2O$, $LiOH$, or $Li_2O$. Since LiOH is the stable form between 100 and about 900° C. (212 and 1652° F.), it was assumed that lithium would occur at LiOH in all cases. In reaction systems where lithium and boron are present, e.g., lithium borohydride, the lithium metaborate ($LiBO_2$) is reported to form. However, the compound was not included in the reactions in Table V because of the lack of thermodynamic data.

An examination of Table V discloses that diborane gives the best ratio of weight of chemical to weight of hydrogen produced. This material is followed closely by beryllium borohydride, pentaborane, lithium borohydride, decaborane, and aluminum borohydride in the order named. Less favorable ratios are shown by magnesium borohydride, lithium hydride, sodium borohydride, lithium aluminum hydride, and calcium hydride.

Other important characteristics of chemical sources of hydrogen are storage stability and the readiness with which the chemicals react with water. Adjective ratings of these characteristics on the chemicals listed in Table V are presented in Table VI (column 7).

In choosing a chemical source of hydrogen for use in a torpedo power plant there are a number of important considerations in addition to those discussed above. If the heat released during the generation of the hydrogen can be recovered, than it becomes an important aspect. The physical state and vapor pressure also may be important depending on how the material is to be utilized. If the hydrogen source and oxygen source are both introduced into a combustion chamber and reacted, with subsequent separation of the solids formed, then liquids such as pentaborane, and aluminum borohydride would be attractive. If on the other hand, the chemical is reacted with water in a hydrogen generator, then the liquids would be unattractive because of phase separation problems and the tendency for vapors to be carried over with the hydrogen. Under these conditions the low vapor pressure solids such as lithium borohydride and lithium hydride would be more promising.

A valid comparison between the various possible sources of oxygen and hydrogen can be made only if the comparison is made on the basis of fuel and oxidant pairs. This is due to the fact that if, for instance, heat is released or consumed during the generation of the hydrogen, this has a bearing on the amount of oxygen required. A weight and volume comparison based on fuel-oxidant pairs is presented in Table VII (columns 7 and 8). In this table, the oxygen sources are limited to compressed molecular oxygen and hydrogen peroxide. For purposes of the comparison, it was assumed that a compressed oxygen tank, containing 26.3 lbs. of available oxygen would occupy a volume of 1200 cu. in. and would weight 55 lbs. It was also assumed that 90% hydrogen peroxide would be used. In calculating weight and volume of the hydrogen producing chemicals and hydrogen peroxide, no allowance was made for tankage. If data on the bulk density of the solid chemicals were unavailable, the value used was 50% of the crystal density.

An examination of Table VII shows that for the particular conditions assumed, in all cases hydrogen peroxide as a source of oxygen is superior to compressed gas storage, the superiority being about 14% on a volume basis and 6% on a weight basis. It is pointed out, however, that the weight and volume of the hydrogen peroxide does not include such items as tankage, transfer arrangements (pumps or gas pressurization) and decomposition chambers. If these factors were included, the comparison would look more favorable for compressed oxygen.

Among the chemical sources of hydrogen, the boranes show a marked superiority on a volume basis. On a weight basis, the performance of the boranes is again outstanding, although equaled by that of lithium hydride. However, there is surprisingly little difference between the various sources of hydrogen, and the choice of a material may well depend on factors other than heat release.

TABLE VI

*Storage and Handling Characteristics of Water Reactive Chemicals*

| Compound | Storage stability | Reaction with water |
|---|---|---|
| Aluminum borohydride | Poor | Good. |
| Beryllium borohydride | Good | Do. |
| Calcium hydride | do | Do. |
| Decaborane | do | Poor. |
| Diborane | Poor | Good. |
| Lithium aluminum hydride | Good | Do. |
| Lithium borohydride | do | Rapid. |
| Lithium hydride | do | Good. |
| Magnesium borohydride | do | Rapid. |
| Pentaborane | Fair | Slow with cold water. |
| Sodium borohydride | Excellent | Do. | ferred material at present is lithium hydride. Within the combustion chamber 13 the hydrogen from the generator 16 is completely oxidized, and the superheated steam produced is directed by a conduit 17 to a heat engine 18 wherein the steam is expanded to drive shaft means 19 mounting a propeller 20 to provide the propulsive effort for the torpedo or submarine.

The expanded steam is thereupon directed through a conduit 21 to a condenser 22, which may be of the surface type provided by the walls of the torpedo or cooled by sea water entering through conduit 23 circulating through coil means 24 and being discharged through a conduit 25. Any non-condensible gases such as hydrogen or oxygen that might result from deviations from stoichiometry in the combustion chamber are directed from the condenser 22 by a conduit 26 under action of a pump 27.

This pump feeds into a conduit 35 wherein is located a two-way valve 36 controlling fluid flow into either of the conduit branch portions 35a or 35b. The branch portion 35b directs the non-condensibles overboard, while conduit branch 35a is connected directly to the combustion chamber 13. It is thus to be seen that by actuation of the valve 36 either a semi-closed or completely closed system may be provided, the latter system resulting when fluid flow through the conduit branch 35a is effected. In this application the pump 27 serves to overcome any pressure drop in the conduit 35 and as well maintains a positive pressure into the combustion chamber 13. As

TABLE VII

*Comparison of Various Fuel-Oxidant Combinations*

| Combination | For ½$O_2$ | | | For $H_2$ | | | Heat released | |
|---|---|---|---|---|---|---|---|---|
| | Wt. (g.) | Vol. (cc.) | H(KgCal.) | Wt. (g.) | Vol. (cc.) | H(KgCal.) | KgCal./cc. | KgCal./g. |
| Compressed oxygen and aluminum borohydride | 33.5 | 26.4 | 0 | 5.94 | 10.9 | 13.65 | 1.91 | 1.81 |
| Compressed oxygen and Calcium hydride | 33.5 | 26.4 | 0 | 21.05 | 24.8 | 27.03 | 1.65 | 1.55 |
| Compressed oxygen and Decaborane | 33.5 | 26.4 | 0 | 5.57 | 14.3 | 21.45 | 1.95 | 2.03 |
| Compressed oxygen and Diborane | 33.5 | 26.4 | 0 | 4.62 | 10.3 | 16.70 | 2.03 | 1.96 |
| Compressed oxygen and Lithium aluminum hydride | 33.5 | 26.4 | 0 | 9.6 | | 15.56 | | 1.70 |
| Compressed oxygen and Lithium borohydride | 33.5 | 26.4 | 0 | 5.45 | 16.5 | 12.47 | 1.64 | 1.80 |
| Compressed oxygen and Lithium hydride | 33.5 | 26.4 | 0 | 7.95 | 20.2 | 26.79 | 1.84 | 2.04 |
| Compressed oxygen and Pentaborane | 33.5 | 26.4 | 0 | 5.26 | 8.6 | 20.35 | 2.23 | 2.02 |
| Compressed oxygen and Sodium borohydride | 33.5 | 26.4 | 0 | 9.47 | 18.2 | 9.05 | 1.50 | 1.56 |
| Hydrogen peroxide and aluminum borohydride | 37.8 | 27.2 | 12.96 | 5.94 | 10.9 | 13.65 | 2.22 | 1.93 |
| Hydrogen peroxide and Calcium hydride | 37.8 | 27.2 | 12.96 | 21.05 | 24.8 | 27.03 | 1.88 | 1.66 |
| Hydrogen peroxide and Decaborane | 37.8 | 27.2 | 12.96 | 5.57 | 14.3 | 21.45 | 2.22 | 2.13 |
| Hydrogen peroxide and Diborane | 37.8 | 27.2 | 12.96 | 4.62 | 10.3 | 16.70 | 2.33 | 2.06 |
| Hydrogen peroxide and Lithium aluminum hydride | 37.8 | 27.2 | 12.96 | 9.6 | | 15.56 | | 1.82 |
| Hydrogen peroxide and Lithium borohydride | 37.8 | 27.2 | 12.96 | 5.45 | 16.5 | 12.47 | 1.91 | 1.92 |
| Hydrogen peroxide and Lithium hydride | 37.8 | 27.2 | 12.96 | 7.95 | 20.2 | 26.79 | 2.06 | 2.13 |
| Hydrogen peroxide and Pentaborane | 37.8 | 27.2 | 12.96 | 5.26 | 8.6 | 20.35 | 2.55 | 2.12 |
| Hydrogen peroxide and Sodium borohydride | 37.8 | 27.2 | 12.96 | 9.47 | 18.2 | 9.05 | 1.76 | 1.69 |

An illustrative power plant system burning hydrogen and oxygen and which may be used with torpedoes having a diameter of the order of 12.75 inches is more or less schematically shown in FIGURE 1, to which reference is now made. The system 10 comprises a tank or container 11 supplying compressed oxygen through a conduit 12 to a combustion chamber 13, an exemplary form of which will be later described. The tank 11 containing compressed oxygen may be maintained at a predetermined temperature by supplying thereto condensate through a conduit 14, and by so providing heat the temperature drop due to expansion is minimized and the amount of residual oxygen decreased. If desired, the condensate supplied to the tank 11 may be heated by passing through a hydrogen generator 16. On the other hand, the stored oxygen tank 11 may be replaced by an oxygen generator to either catalytically decompose hydrogen peroxide or to initiate a reaction between water and a water reactive chemical of the character listed in Table II.

The combustion chamber 13 is supplied with hydrogen through a conduit 15 communicating with a hydrogen generator 16, an illustrative form of which will also be later disclosed. The hydrogen generator 16 contains a water reactive compound listed in Table IV, and a prewill be later noted in connection with a description of the combustion chamber structure of FIGURE 2, the non-condensibles or unburned gases are admitted to the combustion chamber closely adjacent the hydrogen and oxygen inlets served by the conduits 12 and 15 leading from the oxygen and hydrogen sources 11 and 16, respectively. Direct supply of the non-condensibles to the combustion chamber 13, as contrasted with connection to either of the fuel lines 12 or 15, prevents fuel mixing and any possibility of a flameback into the fuel lines.

The provision of a closed system results in a number of advantages. First, exhaust noise and wake created by the discharged gases are eliminated. Secondly, very substantial fuel economies result. The latter advantage is of course of particular importance in those applications wherein the space and weight requirements are limited for one reason or another.

The condensate as appears in FIGURE 1, is withdrawn through a conduit 28 under action of pump means 29 communicating with a conduit 30 having branch portions 30a and 30b. The branch portion 30a introduces water into the hydrogen generator 16 for reaction with the water reactive chemical therein, while conduit branch portion 30b flows condensate to the generator 16 for cooling purposes, and the cooling water is thereupon discharged from the generator 16 by a conduit 31 to perform cooling and working fluid augmentation functions in the combustion chamber 13.

A power plant system generally similar to that just described is more or less schematically illustrated in FIGURE 3, and like numerals have been appended to like parts employed therein. The system of FIGURE 3 is of utility as the propulsive effort for relatively larger torpedoes, having a diameter of approximately twenty-one inches. The system 40 of FIGURE 3 differs essentially from the system 10 of FIGURE 1 by the provision of a tank 41 containing an oxygen source, which may be hydrogen peroxide (90% by weight), directed through conduit means 42 to a decomposition chamber 43 of any known type, wherein the hydrogen peroxide is catalytically decomposed to produce oxygen and steam ported through a conduit 44 to the combustion chamber 13.

The products of combustion from the chamber 13 are directed through a conduit 17 to a turbine or heat engine 18 wherein expansion occurs to drive a shaft 19 carrying a propeller 20, providing propulsive effort for the torpedo. The expanded steam and other gases are then directed through a conduit 45 to a regenerator 46 and therefrom to a condenser 22, which may be of the same construction as the like numbered element in FIGURE 1. The condensate from the condenser 22 passes through a conduit 28 under action of pump means 29 to a conduit 47 leading to the regenerator 46, and conduit 30 communicating with said regenerator 46 has branch portions 30a and 30b supplying water to the hydrogen generator 16 for the dual purposes of reaction with a water reactive chemical and for cooling purposes. As appears in FIGURE 3, a further conduit 48 having valve means 48a therein may connect with the conduit branch portion 30a to supply water to the oxygen generator 41 if a water reactive chemical is employed in substitution for hydrogen peroxide. Of course, in the latter event the decomposition chamber 43 would not be employed.

It is believed now apparent that the oxygen and hydrogen generators, the combustion chamber, the condenser and other elements of the systems of FIGURES 1 and 3 may take various forms. In FIGURE 2 there is shown an illustrative structural embodiment of a combustion chamber, designated generally therein by the numeral 13. The combustion chamber 13 may comprise an outer housing 50 supporting therewithin a coaxially spaced inner shell member 51. The outer housing 50 is formed at one end with an exhaust nozzle portion 52 providing a steam outlet, and the opposite end of the housing 50 mounts the steam or water conduit 31 to provide a steam or water inlet 53 communicating with an annular space 54 through which the steam or water passes prior to injection through an array of jet openings 55 in the inner shell member. To admit oxygen and hydrogen to the interior of the shell member 51, the oxygen and hydrogen conduits 12 and 15 are coaxially spaced to form coaxially spaced inlets 56 and 57. Hydrogen is admitted through the inlet 57 while oxygen enters through an annular space 58 between the conduits 12 and 15. Hydrogen and oxygen in substantially pure form may be admitted through the tube 15 and annular space 58 or they may be in admixture with steam. As also appears in FIGURE 2, the non-condensibles carried in the conduit branch 35a enter the combustion chamber 13 by its inlet 69. The conduit 35a is mounted by the housing 50 and its inlet 69 is located closely adjacent and generally parallel to the oxygen and hydrogen inlets 56 and 57.

The inner shell member 51 defines therewithin a primary combustion zone 59 and downstream therefrom a mixing zone 60. It may be noted that in the primary combustion zone 59 the inner shell member 51 carries a coating 61 of a suitable heat insulative material, such as aluminum oxide. However, if with the hydrogen approximately 50 to 80% steam is admitted through the inlet 57, the heat insulative coating 61 may not be required since the steam will have a cooling effect upon combustion. In the form of combustion chamber illustrated in FIGURE 2, combustion is initiated by a pyrotechnic starter generally designated at 62, and comprising a tubular body member 63 mounted by the chamber housing 50 and inner shell member 51. The tubular body member 63 threadably receives a cap member 64 formed with a cavity 65 therein to house a pyrotechnic charge 66 to be ignited by means of electrical connections 67. Generally speaking, a pyrotechnic starter is preferred by reason of the relatively low wattage required as compared to spark ignition, the large amount of heat generated which assures a more rapid and positive start, and the large volume of gases generated which serves to build up the system pressure more rapidly.

As is now apparent, the steam or water inlet 53 is formed by the condensate conduit 31, FIGURES 1 and 3, and oxygen is supplied to the annular passage 58 between the oxygen supply conduits 12 or 44 of FIGURES 1 or 3, respectively. Hydrogen alone or mixed with steam is of course applied to the inner inlet 57 from the conduit 15 connected to the hydrogen generator. Unburned hydrogen and oxygen from the condenser 22, on the other hand, is admitted to the combustion zone by the inlet 69 when the closed system is used. Upon admission of fuel and oxidizer and ignition of the pyrotechnic starter 62, combustion is initiated, the hydrogen essentially completely oxidized, and by use of the steam or water jets 55, the combustion products are cooled to approximately 1200° F. As has been stated, either pure hydrogen may be used, or a steam-hydrogen mixture in which the steam portion constitutes up to about 80% by weight. Likewise the oxygen will contain 66.6 molar or volume percent steam if it is generated by the catalytic decomposition of hydrogen peroxide.

Referring now to FIGURE 4, there is shown one form of hydrogen generator which effectively overcomes the disadvantages of earlier structures employed for filling balloons, life rafts and the like with lithium hydride as the hydrogen source. In each of the earlier structures a relatively bulky generator was employed, relatively large amounts of water were required to be available, and since each of the prior art hydrogen generators operated at a relatively low temperature, it was impractical to recover the heat of reaction. However, in the structure of FIGURE 4, the rate of hydrogen generation is high on a weight and volume basis and the generator operates with relatively small amounts of water. Further, the structure of FIGURE 4 has a relatively high temperature of operation so that recovery of the heat evolved by hydrolysis is warranted, and as well, in this construction means are provided to effect heat recovery.

As is shown in FIGURE 4, a hydrogen generator 90 comprises a housing 91 packed with lithium hydride crystals 92 or other granular water reactive chemicals in which is embedded a plurality of cooling tubes 93 provided with spray nozzles 94. As is indicated more or less schematically, the housing 91 at one end is formed with a manifold portion 95, while at both ends there are mounted perforated plates 96 receiving the ends of the cooling tubes 93 to permit flow of cooling water from the manifold 95 and through said tubes into a manifold 97 prior to flow into a cooling water outlet 98. It may be seen from FIGURE 4 that the upper perforated plate 96 further receives a hydrogen gas outlet 99 so that gas evolved by contact of the lithium hydride 92 with water flowed to the manifold 95 from an inlet 100 is ported through the hydrogen gas outlet 99 free of admixture with cooling water in the upper manifold 97.

Hydrogen gas produced in the generator 90 flows from the outlet 99 through a conduit 101 and through a proportioning device 102 which also connects with a similar device 102a in an oxygen gas conduit 103 leading to a combustion chamber 104. The combustion chamber 104 may take the form shown in FIGURE 2, and said chamber connects with a turbine or heat engine 105 by means of a conduit 106 in which is located a temperature pickup device 107 connected to a flow regulating valve 108 in a conduit 109 providing communication between the cooling water outlet 98 and the combustion chamber 104. It may now be seen that by provision of the temperature pickup device 107 and flow regulating valve 108 a relatively greater volume of cooling water is admitted to the combustion chamber 104 when the temperature of the products of combustion appears to be relatively high.

In the manner earlier described in connection with FIGURES 1 and 3, the products of combustion from the reaction chamber 104 are expanded in the heat engine 105 and directed through a conduit 110 to a condenser 111. The condensate is thereupon passed from the condenser via a conduit 112 and drawn therethrough under action of a recirculating pump 113 controlled by a pressure relief valve 114. While particular conditions may cause variations in temperatures and pressures in the system of FIGURE 4, by way of illustration the condensate directed to the cooling water inlet 100 may be at a temperature of about 150° F. and a pressure of 2500 p.s.i. The cooling water passing from the outlet 98, on the other hand, may generally be at a temperature of 570° F. and at a pressure of 2400 p.s.i. Hydrogen gas evolved in the generator 90 will generally be found to be at a temperature of 700° F. and at a pressure of 2200 p.s.i. It may now be seen from the foregoing discussion that the hydrogen generator 90 of FIGURE 4 features self-regulation, since a drop in hydrogen pressure will automatically cause more water to be injected into the lithium hydride 92 or other chemical. The generator 90, however, in the system disclosed is not self-starting, although this characteristic can be provided by utilization of means for injecting steam or some highly reactive chemical for purposes of starting.

It may now further be seen that applicants have provided a propulsion system for torpedoes, submarines and the like which overcomes the disadvanatges of prior art heat engines suffering a drastic reduction in power as the depth increases, due to the increase in exhaust pressure and resultant loss in cyclic efficiency. Further, the system herein disclosed, embodying a closed cycle, features condensing substantially all of the working fluids and any non-condensibles are directed to the combustion chamber so that no such materials are discharged overboard to contribute to the torpedo self-noise. As well, the gaseous wake is eliminated, which is important to prevent detection. Further, substantial fuel savings are effected.

By the instant system there is featured burning hydrogen and oxygen to produce superheated steam which is expanded in a heat engine and then condensed to water, producing a cycle which is independent of ambient pressure. As was described, the condensed water may then be employed to cool the combustion chamber by spraying the water therein, to produce additional superheated steam for use in the heat engine. Additionally, the present invention provides novel methods for producing hydrogen and oxygen, by utilization of the condensate to initiate a reaction with water reactive chemicals. As is appreciated, while the instant invention has been described in connection with the propulsion of torpedoes and submarines, it is also of utility for non-propulsive applications, such as providing power for moored submerged sonobuoys and other underwater devices.

This application is a continuation-in-part of our copending application, Serial No. 6,153, filed February 2, 1960, now abandoned.

It is of course to be appreciated that various modifications and changes can be effected in the structures and procedures herein disclosed without departing from the novel concepts of the present invention.

What we claim is:

1. A closed power generating system comprising
   a gaseous oxygen supply means,
   a hydrogen generator containing a water reactive chemical capable of evolving hydrogen gas,
   a combustion chamber means having a combustion zone and a cooling zone to cool said combustion chamber means,
   means to deliver gaseous oxygen and gaseous hydrogen from said oxygen supply means and said hydrogen generator to said combustion chamber combustion zone,
   means to react said gaseous hydrogen and oxygen in said combustion zone to produce superheated steam,
   a heat engine connected to said combustion chamber to receive the superheated steam and expand the same to perform useful work,
   condensing means receiving and condensing the steam from the heat engine,
   means directing one portion of the condensed steam from said condensing means to said combustion chamber cooling zone to cool said combustion chamber means,
   means interconnecting said cooling zone and said combustion zone to deliver condensed steam to said combustion zone to provide additional superheated steam,
   means directing another portion of the condensed steam from the condensing means to said hydrogen generator and into contact with the water reactive chemical to evolve hydrogen gas, and
   means connecting the combustion zone to the condenser to deliver any non-condensibles to said combustion zone to react said non-condensibles and produce superheated steam therefrom.

2. A closed power generating system comprising
   an oxygen generator containing a water reactive chemical capable of evolving oxygen gas,
   a hydrogen generator containing a water reactive chemical capable of evolving hydrogen gas,
   a combustion chamber means having a combustion zone and a cooling zone to cool said combustion chamber means,
   means to deliver gaseous oxygen and gaseous hydrogen from said oxygen generator and said hydrogen generator to said combustion chamber combustion zone,
   means to react said gaseous hydrogen and oxygen in said combustion zone to produce superheated steam,
   a heat engine connected to said combustion chamber to receive the superheated steam and expand the same to perform useful work,
   condensing means receiving and condensing the steam from the heat engine,
   means directing one portion of the condensed steam from said condensing means to said combustion chamber cooling zone to cool said combustion chamber means,
   means interconnecting said cooling zone and said combustion zone to deliver condensed steam to said combustion zone to provide additional superheated steam,
   means directing another portion of the condensed steam from the condensing means to said hydrogen and oxygen generators and into contact with the water reactive chemicals therein to evolve hydrogen and oxygen gas, and means connecting the combustion zone to the condenser to deliver any non-condensibles to said combustion zone to react said non-condensibles and produce superheated steam therefrom.

3. A closed power generating system comprising
   a gaseous oxygen supply means,
   a hydrogen generator containing a water reactive chemical capable of evolving hydrogen gas,
   a combustion chamber means having a combustion zone and a cooling zone to cool said combustion chamber means, means to deliver gaseous oxygen and gaseous hydrogen from said oxygen supply means and said hydrogen generator to said combustion chamber combustion zone, means to react said gaseous hydrogen and oxygen in said combustion zone to produce superheated steam, a heat engine connected to said combustion chamber to receive the superheated steam and expand the same to perform useful work, a regenerator connected to said heat engine to receive steam therefrom, a condenser, means connecting the condenser and the regenerator to deliver the regenerator steam to the condenser to condense said steam, conduit means connecting the condenser and the regenerator to circulate condensed steam through said regenerator, means to direct one portion of the condensed steam from said regenerator to said combustion chamber cooling zone to cool said combustion chamber means, means interconnecting said cooling zone and said combustion zone to deliver condensed steam to said combustion zone to provide additional superheated steam, means directing another portion of the condensed steam from the regenerator to said hydrogen generator and into contact with the water reactive chemical to evolve hydrogen gas, and means connecting the combustion zone to the condenser to deliver any non-condensibles to said combustion zone to react said non-condensibles and produce superheated steam therefrom.

References Cited in the file of this patent

UNITED STATES PATENTS

| | | |
|---|---|---|
| 1,483,917 | Tucker | Feb. 19, 1924 |
| 2,427,707 | Brimm | Sept. 23, 1947 |
| 2,706,890 | Schmidt | Apr. 26, 1955 |
| 2,721,789 | Gill | Oct. 25, 1955 |
| 2,865,721 | Lane | Dec. 23, 1958 |

OTHER REFERENCES

A.P.C. Application of Jaubert, Serial No. 323,624, published April 27, 1943.